United States Patent [19]

Fay, III et al.

[11] Patent Number: 4,810,255
[45] Date of Patent: Mar. 7, 1989

[54] MANUFACTURED FUEL ARTICLE

[75] Inventors: James E. Fay, III; Carl J. Gierke, both of Winnebago County, Wis.

[73] Assignee: Kimberly-Clark Corporation, Neenah, Wis.

[21] Appl. No.: 177,805

[22] Filed: Apr. 11, 1988

Related U.S. Application Data

[63] Continuation of Ser. No. 3,681, Jan. 15, 1987, abandoned.

[51] Int. Cl.$^4$ .......................... C10L 11/06; C10L 5/00
[52] U.S. Cl. ............................................ 44/14; 44/534; 44/541; 44/543; 44/544
[58] Field of Search .................. 44/14, 38, 41, 34, 534, 44/541, 543

[56] References Cited

U.S. PATENT DOCUMENTS

| | | | |
|---|---|---|---|
| 1,194,613 | 8/1916 | Fredrikson | 44/14 |
| 2,475,767 | 7/1949 | Williams et al. | 44/10 |
| 2,475,768 | 7/1949 | Williams | 44/10 |
| 3,227,530 | 1/1966 | Levelton | 44/1 |
| 3,637,355 | 1/1972 | Brockbank | 44/1 |
| 3,706,540 | 12/1972 | Stanton | 44/2 |
| 3,947,255 | 3/1976 | Hartman | 44/10 |
| 3,973,922 | 8/1976 | Williams | 44/13 |
| 4,043,765 | 8/1977 | Tanner | 44/14 |
| 4,104,034 | 8/1978 | Wu et al. | 44/41 |
| 4,120,666 | 10/1978 | Lange | 44/10 |
| 4,243,394 | 1/1981 | Kincaid | 44/14 |
| 4,539,011 | 9/1985 | Kretzschmann | 44/14 |

FOREIGN PATENT DOCUMENTS

| | | | |
|---|---|---|---|
| 1113246 | 12/1981 | Canada | 44/38 |
| 527705 | 10/1940 | United Kingdom | 44/41 |

Primary Examiner—Carl F. Dees
Attorney, Agent, or Firm—Donald L. Traut

[57] ABSTRACT

Manufactured fuel articles having, as a first component, an inner core of a primary fuel element, and as a second component, a combustible covering layer on the primary fuel element. In some embodiments, the covering layer is preferably at least about a nominal 1.5 millimeters thick, with a preferred thickness being at least about 3 millimeters. In other embodiments, the fuel article may be described as a primary fuel element with a combustible covering layer, wherein the primary fuel element comprises a substantial portion of at least one of the ends, and the covering layer and the primary fuel element are in interfacial contact about a majority of the area of their facing surfaces. In still other embodiments, the fuel articles of the invention are described as a primary fuel element and a combustible covering layer in interfacial contact with the fuel element, and wherein the composition of the covering layer differs substantially from the composition of the primary fuel element and comprises a thermoplastic material and pulp fiber. The invention further comprises methods of producing manufactured fuel articles, including, as one method, extrusion coating of the covering layer onto a previously formed primary fuel element, and, as another method, coextruding the primary fuel element and the covering layer together.

35 Claims, 2 Drawing Sheets

MANUFACTURED FUEL ARTICLE

This is a continuation of co-pending application Ser. No. 003,681 filed on Jan. 15, 1987, abandoned.

BACKGROUND OF THE INVENTION

This invention relates to manufactured fuel articles. It relates most directly to manufactured fuel articles using waste products as a substantial fraction of the composition. The waste products most commonly used in articles of this nature are sawdust, wood chips, coal dust, particles of charcoal, waste paper, and the like. It is known to combine these waste products, alone or in combination, with binding materials such as paraffin wax or similar, to form manufactured fuel articles.

The waste products commonly used in the manufacture of fuel articles are considered generally to be dirty. The articles manufactured from these compositions using waste products are usually somewhat fragile, in that the binding material which holds them together, typically wax, may be rather soft; and may melt in the usual burning process. While a higher melting composition may be used, such higher melting compositions may be more difficult to ignite, and so are not generally considered to offer a desirable alternative.

Lower melting waxes used as binders are easier to ignite than the waxes having higher melting temperature. However, waxes only address the degree of difficulty, as all waxes alone are generally difficult to ignite with a match. The difficulty in ignition has been treated in the conventional art in such manners as adding an igniter strip along the length of a log, wrapping the log in an easily ignited package such as paper, or the like.

It is an object of this invention to provide an improved manufactured fuel article.

It is another object to provide such a fuel article which has a pleasant appearance.

It is yet another object to provide such a fuel article which is clean to touch, and pleasant to handle.

It is still another object of the invention to provide a manufactured fuel article which is relatively easier to ignite.

Finally, it is an object to provide a novel method of producing a manufactured fuel article.

SUMMARY OF THE INVENTION

Certain of these and other objects are attained in a manufactured fuel article which has, as a first component, an inner core of an elongated fuel element, and as a second component, a combustible covering layer. The covering layer and the primary fuel element are in interfacial contact about a majority of the area of their facing surfaces. It is preferred that the covering layer and the primary fuel element be in substantially complete interfacial contact about the entire area of their facing surfaces. In some embodiments, it is preferred that the covering layer be bonded to the primary fuel element.

In some of the preferred embodiments, the covering layer is nominally at least about 1.5 millimeters thick. The covering layer is especially preferred to be at least about 3 millimeters thick. In preferred fuel articles of the invention, especially the covering layer is clean to touch. Its preferred composition is that of a thermoplastic material in combination with fibers, preferably pulp fibers. It is preferred that the elongated fuel element comprise at least 55%, by volume, of the fuel article.

Another family of embodiments of the invention is in a combination including the first component primary fuel element as an inner core elongated fuel element and a second component as a combustible covering layer in interfacial contact with the first component about a majority of the area of their facing surfaces, with substantially complete interfacial contact and bonding being preferred. The first component has definable sidewalls and ends, and comprises a substantial portion of the surface of at least one of the ends.

Yet another family of embodiments of the fuel articles of the invention is in a combination including the first component primary fuel element as an inner core, and a second component as a combustible covering layer which comprises a composition which is a combination of thermoplastic material and fiber, preferably pulp fiber.

The invention also includes a method of producing a manufactured fuel article in an extrusion process. The method of manufacturing the fuel article comprises forming the first core fuel element having a longitudinal axis; and extruding a covering layer over the first core fuel element. Preferred embodiments of the process comprise forming the first core element by an extrusion process. The extrusion process may comprise a coextrusion wherein the first core fuel element is simultaneously coextruded with the covering layer. In another method, the first fuel element is separately formed and the covering layer is extrusion coated onto it. In any event the covering layer substantially covers the outside of the core fuel element, to thereby form a fuel article extrudate comprising the core primary fuel element covered by the covering layer. To the extent the fuel article is formed by an extrusion process, it is preferably separated across the width of the extrudate into individual pieces.

DETAILED DESCRIPTION OF THE ILLUSTRATED EMBODIMENTS

Figure 1:
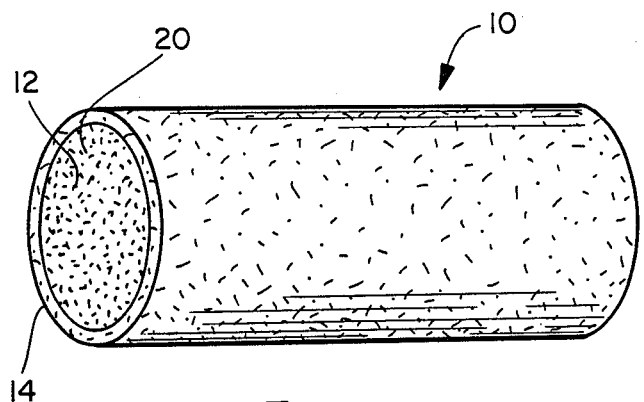
FIG. 1 is a pictorial view of a manufactured fuel article of the invention, and particularly showing a view of the end of the fuel article.

Referring now to FIG. 1, the invention is seen to be illustrated as a manufactured fuel article in the shape of a log 10 comprising an inner core primary fuel element 12 and a covering layer 14. The fuel article 10 is in the shape of a log having substantially rounded cross-section. The fuel articles of the invention may have any of a wide variety of cross-sections.

Figure 2:
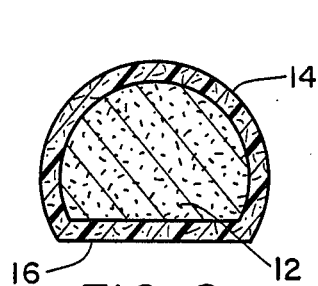
FIGS. 2, 2A and 3 show alternative illustrative cross-sections for fuel articles of the invention.
Figure 2A:
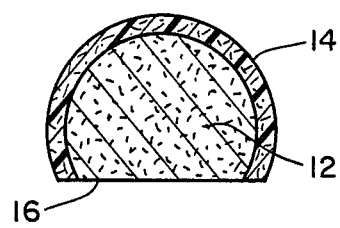

FIGS. 2 and 2A show a circular type cross-section with one flat sidewall 16 which may contribute to the positional stability of the fuel article.

Figure 3:
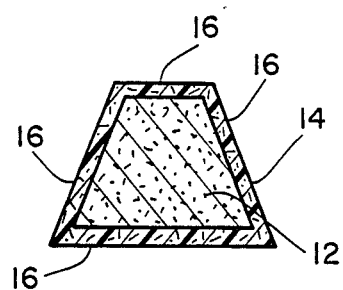

FIG. 3 has a plurality of flat surfaces 16, with the overall shape of the fuel article being that of a trapezoid. Other shapes and dimensions are acceptable.

The length of the fuel article depends on its intended use. For use as in a fireplace, the log length as in FIG. 1 is preferred. For uses in other applications and other burner configurations, shorter or longer lengths may be desired and are contemplated herein.

The primary application for fuel articles of the invention is contemplated to be as logs as illustrated in FIG. 1. A typical dimension, then, for a fuel log of the invention is approximately 100 millimeters in diameter and approximately 400 millimeters in length.

It is contemplated that the fuel articles of the invention will be primarily comprised of the first inner core primary fuel element 12. The composition of fuel element 12 is not particularly critical, so long as it is coordinated with the balance of the composition and structure. Its composition may include any of the conventional compositions known, or may be a proprietary composition. Thus, among the conventional compositions for manufactured fuel articles, illustrative compositions for primary fuel element 12 include combinations of wood chips and wax; wood chips, coal and wax; charcoal compositions; compositions including waste papers; and the like.

The composition and thickness of covering layer 14 is specifically concerned with the objects and features, and the overall characteristics desired for the invention, and achieved by it. Layer 14 may be characterized in at least two different ways. In some embodiments, layer 14 may be characterized according to its thickness. In other embodiments, layer 14 may be characterized as a covering layer having composition which differs substantially from that of the core primary fuel element 12.

In the thickness characterization, the minimum thickness for layer 14 is about 1.5 millimeters, with a preferred thickness of at least about 3 millimeters, and a most preferred thickness of approximately 5 to 10 millimeters.

The use of the fuel articles of the invention is described herein in terms of the use of a log in a fireplace. Adaptations will then be obvious for using other configurations of the fuel articles and other devices for burning them. With respect to the log seen in FIG. 1, the composition of layer 14 is selected such that it is readily ignited using a match. Such a composition is found, for example, in certain of the thermoplastics compositions, and particularly those whose composition includes substantial fractions of fibrous material. Typical fibers are cotton, paper pulps, and the like, whether as individual fibers, as conglomerations, or as fabrications such as strings or small ropes. A log may be ignited by placing it on the fireplace grate, and bringing a lighted match close to it, in typical manner of lighting a readily ignitable article. The initial ignition takes place in layer 14, which may have a plurality of wick-like fibers near its surface, which ignite and burn somewhat like a candle wick. As layer 14 burns, part of the heat of combustion is used to raise additional material of layer 14 to the ignition temperature, and to spread the flame over the entire surface of the log. An additional portion of the heat of combustion is used to raise the temperature of the adjacent material of primary fuel element 12 to its ignition temperature. As the material in layer 14 burns, and the temperature of the material in fuel element 12 continues to rise, the material of fuel element 12 eventually reaches its ignition temperature. It is desired that the compositions of layers 12 and 14 be cooperatively designed in combination with the thickness of layer 14 such that layer 12 is substantially ignited by the time layer 14 has been fully consumed. It is desired in some embodiments that layer 14 not be unnecessarily thicker, as it is generally more expensive than the materials of layer 12, and may have less heat output per unit of cost. It is, of course, necessary that layer 14 be thick enough that it not be completely consumed before layer 12 has reached its ignition temperature, at which point the fuel article of the invention would simply cease burning and would not function properly in accordance with the burning characteristics intended for it. In some embodiments, layer 14 may be thicker than the minimum thickness required to ensure ignition of fuel element 12, as certain of the compositions contemplated for layer 14 provide substantial stiffness and structural strengthening of the fuel article where primary fuel element 12 is somewhat soft, pliable, or otherwise deformable.

The minimal thickness for layer 14 which is seen to be consistent with its manufacturing process, and with its providing adequate ignition temperature for a readily ignitable, low temperature ignitable, fuel element 12 is approximately 1.5 millimeters. The typical range of thicknesses for layer 14, for a substantial variety of compositions for primary fuel element 12 is approximately 5 to 10 millimeters.

The thickness of layer 14 will also be affected by the overall thickness of the fuel article 10. It is highly desirable that the primary fuel element 12 comprise at least 55% by volume of the fuel article, which corresponds to approximately 75% of the diameter of a uniform and circular log as seen in FIG. 1. For the standard size fuel articles envisioned, such as 100 millimeters in diameter and 400 millimeters in length, an overall thickness of approximately 5 to 10 millimeters is considered normal. For an overall thickness of, for example, 25 millimeters, a thinner layer is preferred, more on the order of 1.5 to 3 millimeters. For logs of a larger size than 100 millimeters, for example 200 to 400 millimeters, the overall thickness of the covering layer could vary substantially, depending on the materials of construction and the properties desired according to other criteria.

In another family of embodiments, the fuel article is preferably described with respect to the relationship of fuel element 12 to the surface 20 of the end of the log. In that respect it is seen that a substantial portion of the surface 20 of the end of the log comprises primary fuel element 12.

Still other embodiments of the invention are seen in a combination of primary fuel element 12 and covering layer 14 wherein the compositions of the two elements are substantially different.

It is significant in all the embodiments of the invention that covering layer 14 be combustible. It is also seen that covering layer 14 and fuel element 12 are in interfacial contact about a majority of the area of their facing surfaces. They are preferably in complete interfacial contact, and are preferably bonded to each other.

With the capabilities for the composition of covering layer 14 being different from that of fuel element 12, the composition of covering layer 14 may be selected based on different criteria than are used for selecting the composition of layer 12, for example appearance. The preferred fuel articles of the invention have an appearance which resembles that of a wood log having a relatively light colored bark, such as white birch, beech, or the like. Such light colored woods are perceived as having a premium value, because of their appearance. With the use of a separate covering layer 14, materials may be selected, for color, which generate a similar perception of premium value. With the use of a covering layer 14 over primary fuel element 12, the color of fuel element 12 is relatively insignificant in terms of the overall appearance of the fuel log. Thus, the composition of fuel element 12 may be selected according to criteria other than appearance—such as economy, ignition properties, heat output, and the like. The composition of layer 14 is selected for criteria of appearance, ease of ignition, etc. With the criteria thus being separately defined for the two components, it is possible to obtain a fuel article which maximizes the benefits of both components. The composition of fuel element 12 may be selected only with regard to its burning properties and its economy, for example, without regard to appearance or cleanliness. The material of layer 14 may be selected with less concern for cost, or heat output, so long as it addresses the criteria defined for its selection.

A preferred composition for layer 14 includes a thermoplastic polymer which is rigid, tough, appealing in appearance, is easily ignited, is clean burning, and is readily processed. Typical of the preferred polymers are thermoplastics such as the polyethylenes, polypropylenes, polyesters, nylons, and the like. While it will be appreciated that these polymers are particularly expensive in virgin form, as recycled waste materials they are substantially more economical. Where quantities of scrap, waste, or trimmings can be obtained, these materials provide desirable components for the composition, particularly, of layer 14. Another desirable component of the layer 14 composition is fiber. Fibers may be obtained as scrap paper, rag waste, paper machine or paper mill waste, or may be recycled material from compositions which are a combination of polymer and fiber. In addition to the polymer and the fiber, it is preferred that the composition include some wax. It is considered herein that the conventional distinction between waxes and thermoplastic polymers is somewhat blurred. The term "wax" as used herein refers to the lower melting polymeric compositions for use as a blend component with a higher melting composition which would not normally be considered a wax. Thus "wax" includes those compositions normally considered waxes, as well as some lower melting compositions which are normally considered thermoplastic polymers.

The primary purpose of the wax is to facilitate the extrusion process by providing a lower melting component to the composition. To the extent a composition provides this property, it is a wax within the meaning of the invention.

Preferred compositions for layer 14 include approximately 20% to 50% wax, and approximately 80% to 50% of a composition comprised of polymer and fiber. With respect to the overall composition, fiber is preferably present in an amount of 10% to up to about 50% by weight, with the balance of the composition being the polymer and the wax. Preferred ratio of wax/polymer is between about 3/1 and about 0.7/1. The compositional relationships vary, depending upon the specific material compositions used and upon the physical characteristics of the fiber. It is critical that the composition contain sufficient polymer and wax to effect flow of the composition in the extrusion process.

Suitable polymer-fiber combinations may be obtained, for example, in waste from manufacturing nonwoven articles, especially those made by spun-bonded or melt-blown processes. These combinations are then combined with wax, as necessary, for the carrying out of the extrusion process. The illustrated compositions for layer 14 are not seen to be particularly critical, so long as they function according to the objectives and characteristics of the invention.

The primary fuel element 12 may be fabricated by any conventional process, and may have a conventional composition. In that regard, it is seen that fuel logs of the prior art could provide compositions, processes, and finished products consistent with the fuel element 12. In the invention, such logs can be formed into fuel articles of the invention by coating them with covering layer 14. Covering layer 14 can then be described in terms of its thickness, the composition of its end surfaces, or the relative compositions of primary fuel element 12 and covering layer 14. The preferred method of applying covering layer 14 to a previously fabricated primary fuel element 12 is by extrusion coating as seen in FIG. 4, with or without spacing between the individual logs.

Figure 4:
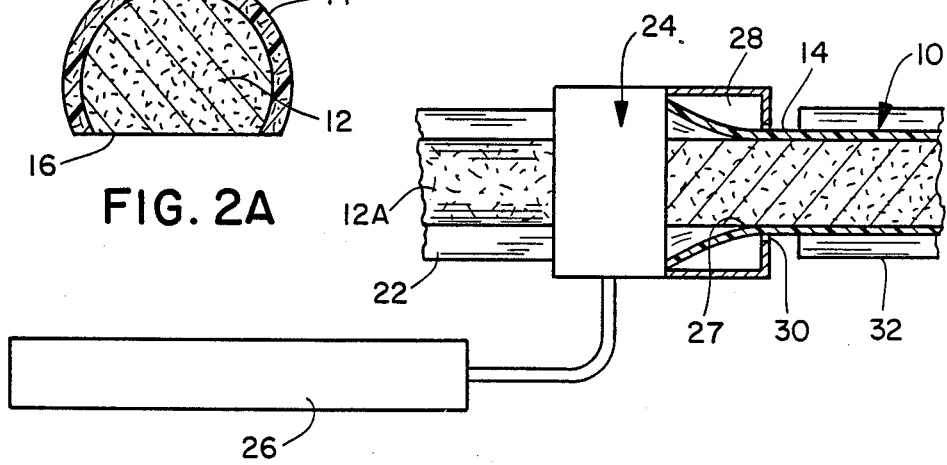
FIG. 4 shows a top view, with portions, in section, and fragmented, of an extrusion coating process for manufacturing fuel articles of the invention.

FIG. 4 is a top view of a processing operation for applying layer 14 to previously formed fuel element 12. The fuel element 12A is fed to the process by an underlying conveyor belt 22. Fuel element 12A passes through die 24. Extruder 26 extrudes an appropriate composition of covering material into die 24 which applies it onto fuel article 12 at a general location 27. Layer 14 and fuel element 12A are shown in cross-section after leaving die 24. Appropriate temperature controls are maintained in the trailing portion 28 of die 24 such that the covering layer 14 is deposited on fuel element 12A, preferably adhered to it, and solidifies on the surface of fuel element 12A, forming the overall composite fuel article 10 as it exits the end 30 of die 24, and is picked up by exit conveyor 32.

Figure 5:
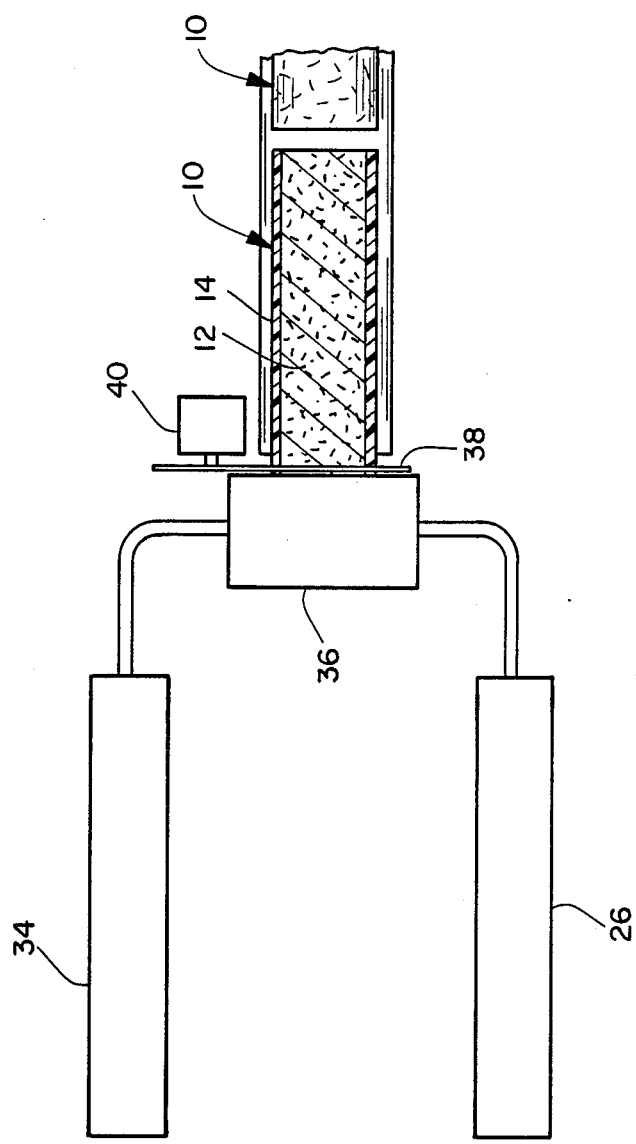
FIG. 5 shows a top view, with portions in section, of a coextrusion process for manufacturing fuel articles of the invention.

Another, and preferred, method of forming the fuel articles of the invention is seen in FIG. 5. In FIG. 5 a first extruder 34 extrudes an appropriate composition for primary fuel element 12 into the combining die 36. A second extruder 26 extrudes an appropriate composition for layer 14 into the same combining die 36. In the die, the compositions are brought together such that the fuel article is coextruded, with the covering layer 14 substantially covering the entire outside surface of the fuel element 12. The fuel article extrudate then comprises a core fuel element covered by the covering layer. Die 36 could alternately be configured such that covering layer 14 covers less than the entire surface of the fuel element 12. Typically such configurations would produce covering layer 14 as one or more strips of extrudate spaced from each other about the circumference of the extruded log. Where a single strip is formed, it may cover a substantial fraction of the angular perimeter/circumference at the fuel element, as seen in FIG. 2A.

In some embodiments, the process of making the fuel article includes a speed differential between fuel element 12 and covering layer 14 wherein fuel element 12 departs the extrusion die area slower than covering layer 14 is being extruded from the die. Extrudate 14 is partially cooled so that it has some structural integrity. Element 12 is maintained sufficiently warm to promote bonding between element 12 and layer 14. This combination results in layer 14 bonding to fuel element 12 at laterally spaced locations, and having a rippled exterior surface more closely resembling natural tree bark. Fuel articles made by this process, or another process yielding a product having similar spaced interfacial contacts, is included within the meaning of the invention, and specifically within the meaning of "interfacial contact."

As seen in FIG. 5 the extrudate is cut at appropriate intervals by cutter 38, driven by motor 40, and in accordance with the rate of formation of the extrudate from die 36. Thus, the depiction in FIG. 5 shows the end of one log 10 and another fully formed log 10 which is in the process of being separated from the extrudate by a cutting blade 38 at the outlet of the die 36.

As the articles are formed according to FIG. 5, the surfaces of the ends of each log comprise a combination of an inner portion of the circular surface area which is made from primary fuel element 12 and an outer ring-shaped portion which comprises the covering layer 14. The sides of the log, as along the sides of a cylinder, are substantially completely covered by covering layer 14, all as seen generally in FIG. 1.

Depending upon the method of forming the primary fuel element 12, there may be substantial irregularities in its surface, such that layer 14, which is generally considered to have a substantially uniform outer surface along a longitudinal direction thereof, may have substantial variations in its thickness. It is preferred, though, that the longitudinal surfaces of the log be substantially completely formed from the material of layer 14. To the extent layer 12 material protrudes to the outer surface of the fuel article, the benefit of including layer 14 will be reduced, and thus the advantages of the invention will be achieved in lesser proportion.

With respect to the cleanliness of the fuel articles of the invention, it is desired that the user be able to handle them without having to be concerned with the cleanliness of his own person or his clothing. Thus where the term "clean to touch" is used, it is intended that it be defined functionally with respect to the ability of a person to handle the fuel articles of the invention without substantial risk of having to wash either his own person or his clothes after modest amount of handling of the fuel article.

With respect to layer 14, there has been description of thermoplastic materials in its composition. The use of the term "thermoplastic" comprehends both polymers which are normally considered thermoplastic polymers and waxes which are substantially solid at room temperature and may be liquified, or melted, by ordinary heating processes. Thus, the thermoplastic compositions described herein may include polymers, waxes, and blends of polymers and waxes, though the higher molecular weight polymers are preferred for their structural toughness, rigidity, and cleanliness properties.

The fibers contemplated as being used in layer 14 are preferably pulp fibers. Such fibers may be extracted from wood, bagasse, sugar beets, sugar cane, peat, and the like. Other fibers are acceptable, but are contemplated as being substantially more expensive and so are not preferred.

To the extent that fuel articles of the invention are made by compatible processes, the composition of covering layer 14 may be a permanently setting material (commonly referred to as thermosets) such as epoxy or the like, which is not usually considered thermoplastic. Thus, fuel articles of the invention may be made by processes other than the extrusion process, in which case these permanently setting materials may be used, especially those which do not give off especially toxic fumes upon burning, it being understood that normal products of combustion of conventional fuel articles have a certain, and recognized level of toxicity. With respect to fuel articles made by non-extrusion type processes, the term "thermoset" as it refers to covering layer 14 comprehends within its meaning the above contemplated permanently setting materials.

Thus, it is seen that the invention provides a family of improved manufactured fuel articles. The fuel articles of the invention may have a pleasant appearance, and are typically clean to touch and pleasant to handle.

Certain embodiments of the fuel articles of the invention are relatively easier to ignite than corresponding fuel articles of the conventional art.

There is also provided a novel method of producing a manufactured fuel article.

What is claimed is:

1. A manufactured fuel article, comprising:
   (a) an inner core of an elongated primary fuel element having an outer surface; and
   (b) a combustible covering layer, having a substantially uniform outer surface, on said primary fuel element, said covering layer being nominally at least above 1.5 millimeters thick, said covering layer having been applied to said primary fuel element in a melted state, whereby said covering layer flowed about any surface irregularities in said outer surface of said primary fuel element, such that the thickness of said covering layer varies according to the irregularities in said outer surface of said primary fuel element, said covering layer and said primary fuel element being in interfacial contact about a majority of the area of facing sufaces thereof.

2. The manufactured fuel article as in claim 1 wherein said covering layer is, nomimally, at least about 3 millimeters thick.

3. The manufactured fuel article as in claim 1, said primary fuel element and said covering layer being in substantially complete interfacial contact about the entire area of the facing surfaces thereof, the composition of said outer covering layer comprising at least 20% wax, and sufficient polymer to provide a wax/polymer ratio of about 0.7/1 to about 3/1.

4. The manufactured fuel article as in claim 1, said covering layer being bonded to said primary fuel element.

5. The manufactured fuel article as in claim 1 wherein said covering layer is clean to touch.

6. The manufactured fuel article as in claim 1 wherein said covering layer comprises thermoplastic material and pulp fiber.

7. The manufactured fuel article as in claim 2, 3, or 4 wherein at least 55% of the volume of said fuel article comprises said primary fuel element.

8. A manufactured fuel article, comprising:
   (a) an inner core of a primary fuel element having sidewalls, ends, and an outer surface; and
   (b) a combustible covering layer, having a substantially uniform outer surface, said covering layer and said primary fuel element being in interfacial contact on said sidewalls of said primary fuel element, said primary fuel element comprising a substantial portion of the surface of at least one of said ends, said covering layer being bonded to said primary fuel element, and having been applied to said primary fuel element in a melted state, whereby said covering layer flowed about any surface irregularities in said primary fuel element, such that the thickness of said covering layer varies according to the irregularities in the outer surface of said primary fuel element.

9. The manufactured fuel article as in claim 8, said primary fuel element and said covering layer being in substantially complete interfacial contact about the entire area of the facing surfaces thereof.

10. The manufactured fuel article as in claim 8 or 9 wherein said covering layer is nominally at least about 1.5 millimeters thick.

11. The manufactured fuel article as in claim 9 wherein said covering layer is nominally at least about 3 millimeters thick.

12. The manufactured fuel article as in claim 8 wherein the composition of said covering layer comprises thermoplastic material and pulp fiber.

13. The manufactured fuel article as in claim 10 wherein the composition of said covering layer comprises thermoplastic material and pulp fiber.

14. The manufactured fuel article as in claim 11 wherein the composition of said covering layer comprises thermoplastic material and pulp fiber.

15. The manufactured fuel article as in claim 8 wherein at least 55% of the volume of said fuel article comprises said primary fuel element.

16. The manufactured fuel article as in claim 11 wherein at least 55% of the volume of said fuel article comprises said primary fuel element.

17. A manufactured fuel article, comprising:
 (a) an inner core of a primary fuel element; and
 (b) a combustible covering layer, the composition of said covering layer differing substantially from the composition of said primary fuel element and comprising (i) about 50% to about 90% by weight of a thermoplastic composition comprising wax and a polymer, the ratio of wax/polymer being between about 0.7/1 and 3/1, and (ii) about 50% to about 10% by weight pulp fiber, said wax comprising about 20% to about 50% by weight of the overall composition of said covering layer, said covering layer and said primary fuel element being in interfacial contact about a majority of the area of facing surfaces thereof.

18. The manufactured fuel article as in claim 17, said primary fuel element and said covering layer being in substantially complete interfacial contact about the entire area of the facing surfaces thereof.

19. The manufactured fuel article as in claim 17, said covering layer being bonded to said primary fuel element.

20. The manufactured fuel article as in claim 17 wherein said covering layer is clean to touch.

21. The manufactured fuel article as in claim 17 wherein said covering layer is nominally at least about 1.5 millimeters thick.

22. The manufactured fuel article as in claim 21 wherein said covering layer is nominally at least about 3 millimeters thick.

23. The manufactured fuel article as in claim 17 wherein at least 55% of the volume of said fuel article comprises said primary fuel element.

24. The manufactured fuel article as in claim 23 wherein at least 55% of the volume of said fuel article comprises said primary fuel element.

25. The manufactured fuel article as in claim 17, 18, or 19, said primary fuel element having sidewalls and ends, said primary fuel element comprising a substantial portion of the surface of at least one of said ends.

26. The manufactured fuel article as in claim 1 said fuel article having been made by a coextrusion process.

27. The manufactured fuel article as in claim 5, said fuel article having been made by a coextrusion process.

28. The manufactured fuel article as in claim 8 wherein the composition of said covering layer comprises thermoplastic material and pulp fiber, said fuel article having been made by a coextrusion process.

29. The manufactured fuel article as in claim 23, said fuel article having been made by a coextrusion process.

30. The manufactured fuel article as in claim 12, said fuel article having been made by extrusion coating said covering layer onto said primary fuel element.

31. A method of poducing a manufactured fuel article, comprising:
 (a) forming a primary core fuel element having a longitudinal axis;
 (b) heating a thermoplastic composition above its melting point, thereby producing a flowable melt;
 (c) extruding said flowable melt through a die and depositing a coating of said flowable melt as a covering layer on said core fuel element along the direction of said longitudinal axis, whereby said flowable melt flows about any surface irregularities in the outer surface of said core fuel element, such that the thickness of said covering layer varies according to the surface irregularities, while maintaining a substantially uniform outer surface on said covering layer and thus on said fuel article; and
 (d) solidifying said flowable melt on the surface of said core fuel element.

32. The method of producing a manufactured fuel article as in claim 31 wherein said core fuel element is formed by an extrusion process.

33. The method of producing a manufactured fuel article as in claim 31 or 32 wherein said flowable melt of said covering layer comprises up to 50% by weight unmelted pulp fiber and wherein said flowable melt is extruded as a composition comprising both melted thermoplastic material and unmelted pulp fiber.

34. A method of producing a manufactured fuel article, comprising:
 (a) extruding a continuous first primary core fuel element composition through an extruder and into a coextrusion die;
 (b) heating a thermoplastic composition above its melting point, thereby producing a flowable melt, and forcing said flowable melt through an extruder and into said coextrusion die;
 (c) concentrically combining said first core element composition with said flowable melt in said coextrusion die and coextruding said core fuel element composition and said flowable melt as an extrudate, said extrudate comprising said core primary fuel element and a covering layer, said covering layer being derived from said flowable melt, and substantially covering the outside surface of said core fuel element;
 (d) cooling said flowable melt below its melting temperature, to thereby form a solid outer covering on said extrudate, and thus to form a fuel article of said extrudate, said fuel article comprising said core fuel element covered by said solid outer covering layer; and
 (e) transversely separating said extrudate into individual pieces.

35. The method of producing a manufactured fuel article as in claim 34 and including coextruding said covering layer and said core element such that, in said coextrudate, said covering layer covers substantially the entire extruded surface of said fuel element.

* * * * *